United States Patent [19]
Park et al.

[11] Patent Number: 4,816,552
[45] Date of Patent: Mar. 28, 1989

[54] AROMATIC POLYESTER COMPOUNDS AND PROCESS FOR PREPARING THEM

[75] Inventors: Ho J. Park, Seoul; Seo W. Kim, Kumi; Jung I. Jin, Seoul; Suck H. Lee, Sihung, all of Rep. of Korea

[73] Assignee: Kolon Industries, Inc., Seoul, Rep. of Korea

[21] Appl. No.: 32,172

[22] Filed: Mar. 30, 1987

[51] Int. Cl.$^4$ .................... C08G 17/02; C08G 17/08; C08G 39/10
[52] U.S. Cl. .................................... 528/271; 528/176
[58] Field of Search ............................... 528/271, 176

[56] References Cited

U.S. PATENT DOCUMENTS 3,637,595  1/1972  Cottis et al. ........................ 528/193
3,756,988  9/1973  Kollar et al. ........................ 528/271
3,772,405  11/1973  Hamb ................................. 528/271

FOREIGN PATENT DOCUMENTS 56-90829  7/1981  Japan.

Primary Examiner—Harold D. Anderson
Attorney, Agent, or Firm—Michael N. Meller

[57] ABSTRACT

Polymers having improved tenacity and heat resistant properties are prepared by heating a mixture of a 4-acetoxybenzoic acid derivative, a hydroquinone diacetate derivative, a dicarboxylic acid, and a 4-acetoxy-(4-acetoxyphenyl)benzoate derivative in two steps to remove generated acetic acid and form the polymer, which is useful for making fibers, films and molded products.

15 Claims, 2 Drawing Sheets

AROMATIC POLYESTER COMPOUNDS AND PROCESS FOR PREPARING THEM

BACKGROUND OF THE INVENTION

The present invention relates to the preparation of new aromatic polyester compounds represented by the following general formula (I); this deals specifically with following sequence of recurring units:

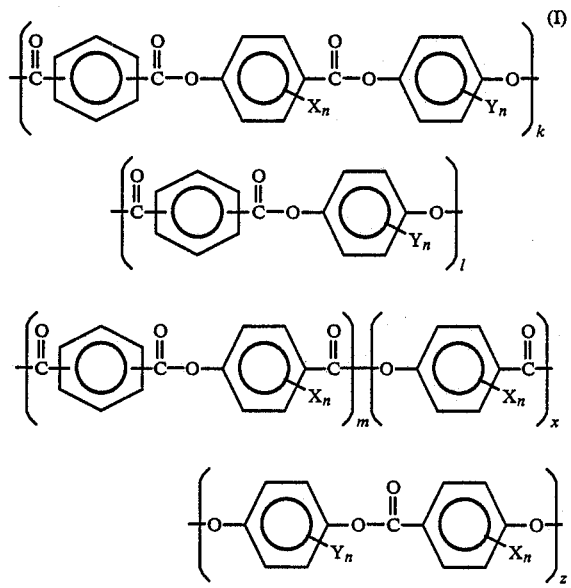

wherein,
X and Y represent substituents selected from the group consisting of H, Cl, Br, a phenyl group and a $C_1$-$C_4$ alkyl group;
n is a positive integer from 1 to 4, indicating the number of X and Y substituents;
k,l,m,x, ... z are positive integers from 1 to 1500; and $$[k/(k+l+m+x+ \ldots +z)]\times 100 = a,$$

where a=20 to 100%. In this case, if "a" is 100%, the said polyester turns into the polymer which is represented by the following general formula (II), which has the following sequence of recurring units.

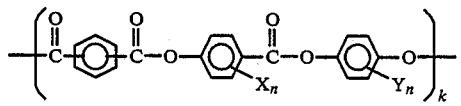

wherein,
X and Y represent substituents selected from the group consisting of H, Cl, Br, a phenyl group and a $C_1$-$C_4$ alkyl group;
n is a positive integer from 1 to 4, indicating the number of X and Y substituents; and
k is a positive integer from 1 to 1500.

Prior polyester compounds represented by polyethylene terephthalate have been widely used in fiber, film, plastics, etc, but there was much room for improvement of their tenacity and heat resistant properties.

Aromatic polyester compounds developed to meet such demand, were liquid crystal, which had a high modulus, high tenacity and low extensity. However, due to the high melting point and melt viscosity, processing was a very difficult problem. Recently, in order to overcome these problems a process for preparing copolymers, consisting of three or four differnt monomers, has been studied.

However, said co-polymer easily took the form of a block co-polymer, or somtimes a random co-polymer because of the inevitable discrepancy of reactivity among the monomers. As a result in addition to the physical properties of the resulting polymer, the melting point and melt viscosity, varied greatly with the reaction conditions, therefore quality control was very difficult.

In particular, a manufacturing process for an aromatic polyester consisting of a 4-hydroxybenzoic acid derivative, a diol of the hydroquinone series and isophthalic acid, said acidolysis method (U.S. Pat. No. 3,637,595), and phenolysis method (Japanese patent laid open No. 56-90,829) have now been disclosed. But in the operation of acidolysis method, if hydroquinone diacetate, 4-acetoxybenzoic acid and isophthalic acid are polymerized in accordance with a prior method, a partial block, consisting primarily of 4-acetoxybenzoic acid is formed in the polymer. This is the reason why the reactivities of said three ingredients are different from each other.

Consequently, the resulting polymer has no practical use because it has not only a high melting point and melt viscosity, but also an inferior processing ability, especially for spinning.

The phenolysis method proposed to solve the above problems. In this method hydroquinone, 4-hydroxybenzoic acid phenyl ester and diphenyl isophthalate are polymerized. But this method did not solve the problem which was caused by the discrepancy of reactivity among the monomers. The color of the polymer became black and the molecular weight dropped, because the —OH radical of hydroquinone oxidizes to a quinoid very easily.

In order to solve the problems of prior methods, the following method was invented. A new monomer, 4-acetoxy-(4-acetoxy phenyl)benzoate derived from hydroquinone diacetate and 4-acetoxybenzoic acid, is used as a unit of polymerization.

SUMMARY OF THE INVENTION

The object of the present invention is to provide new aromatic polyester compounds and the processes for preparing them. They are in the domain of liquid crystal which have excellent physical properties and processability especially spinning due to sequence regularity in the partial or total monomer.

In the present invention, sequence regularity means the arrangement of monomers only, regardless of the substituent indicated by X and Y on the rings of the following formulas (I) and (II). The new polymers produced according to the present invention are represented by a sequence of recurring units as follows;

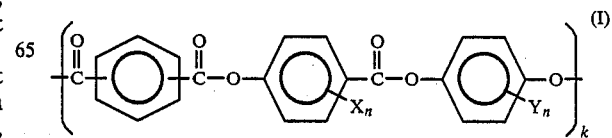

-continued

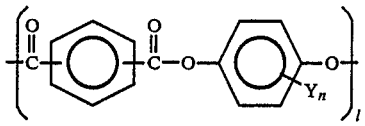

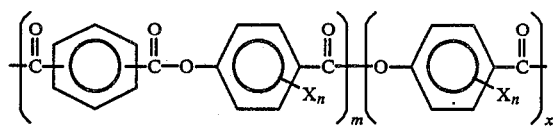

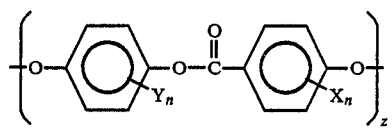

wherein,

X and Y represent substituents selected from the group consisting of H, Cl, Br, a phenyl group and a $C_1$-$C_4$ alkyl group;

n is a positive integer from 1 to 4, indicating the number of X and Y substituents;

k,l,m,x, ... z are positive integers from 1 to 1500; and $$[k/+l+m+x+z]\times 100 = a$$

with the proviso that there are no carbonyl-carbonyl or oxygen-oxygen units therein, where a=20 to 100%, preferably a=30%. In this case, if "a" is 100%, the said polyester becomes the polymer represented by following general formula (II), which also has the following sequence at recurring units,

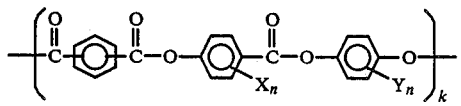
(II)

wherein,

X and Y represent substituents selected from the group consisting of H, Cl, Br, a phenyl group and a $C_1$-$C_4$ alkyl group;

n is a positive integer from 1 to 4, indicating the number of X and Y substituents; and k is a positive integer form 1 to 1500.

DETAILED DESCRIPTION

Various monomers can be used to produce the polymers of the present invention as follows;

(1) 4-acetoxybenzoic acid derivatives (ABA)

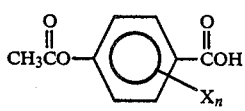
(III)

wherein,

X represent substituents selected from the group consisting of H, Cl, Br, a phenyl group and a $C_1$-$C_4$ alkyl group; and n is a positive integer from 1 to 4, indicating the number of X substituents;

4-acetoxybenzoic acid (H—ABA), 4-acetoxy-2-chlorobenzoic acid,
4-acetoxy-3-chlorobenzoic acid, 4-acetoxy-2-bromobenzoic acid,
4-acetoxy-3-bromobenzoic acid, 4-acetoxy-2-ethylbenzoic acid,
4-acetoxy-3-methylbenzoic acid, 4-acetoxy-2-phenylbenzoic acid,
and 4-acetoxy-3-phenylbenzoic acid, etc.

(2) Hydroquinone diacetate derivatives (HD)

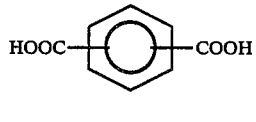
(IV)

wherein,

Y represents substituents selected from the group consisting of H, Cl, Br, a phenyl group and a $C_1$-$C_4$ group; and n is a positive integer from 1 to 4, indicating the number of Y substituents; hydroquinone diacetate (H—HD), chlorohydroquinone diacetate (Cl—HD) bromohydroquinone diacetate(Br—HD), methylhydroquinone diacetate ($CH_3$—HD) and phenylhydroquinone diacetate, etc.

(3) Dicarboxylic acid (DCA)

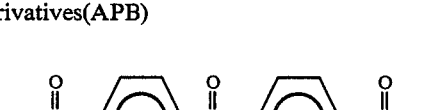
(V)

terephthalic acid(TPA), isophthalic acid (IPA), etc.

(4) 4-acetoxy-(4-acetoxyphenyl)benzoate acid derivatives(APB)

(VI)

wherein,

X and Y represent substituents selected form the group consisting of H, Cl, Br, a phenyl group and a $C_1$-$C_4$ alkyl group; and n is a positive integer from 1 to 4, indicating the number of X and Y substituents;

1. H—APB (provided that both of X and Y designates H)
2. Cl—APB (provided that X and Y designate H and Cl respectively, and n=1)
3. $CH_3$—APB (provided that X and Y designate H and $CH_3$ respectively, and n=1)

The processes for the preparation of the polymers of the general formula (I), (II) from the said monomers, are as follows; the polymer of the general formula (I) may be prepared by the polymerization of APB and DCA, ABA, HD, provided that the portion of APB shall be more than 20 mole% preferably 30 mole% of the sum of AFB and HD. If "a"reaches 100% in the general formula(I), the said former polymer is identified with the polymer of the general formula(II). The latter polymer may be prepared by reacting APB with the equivalent moles of DCA.

Figure 1:
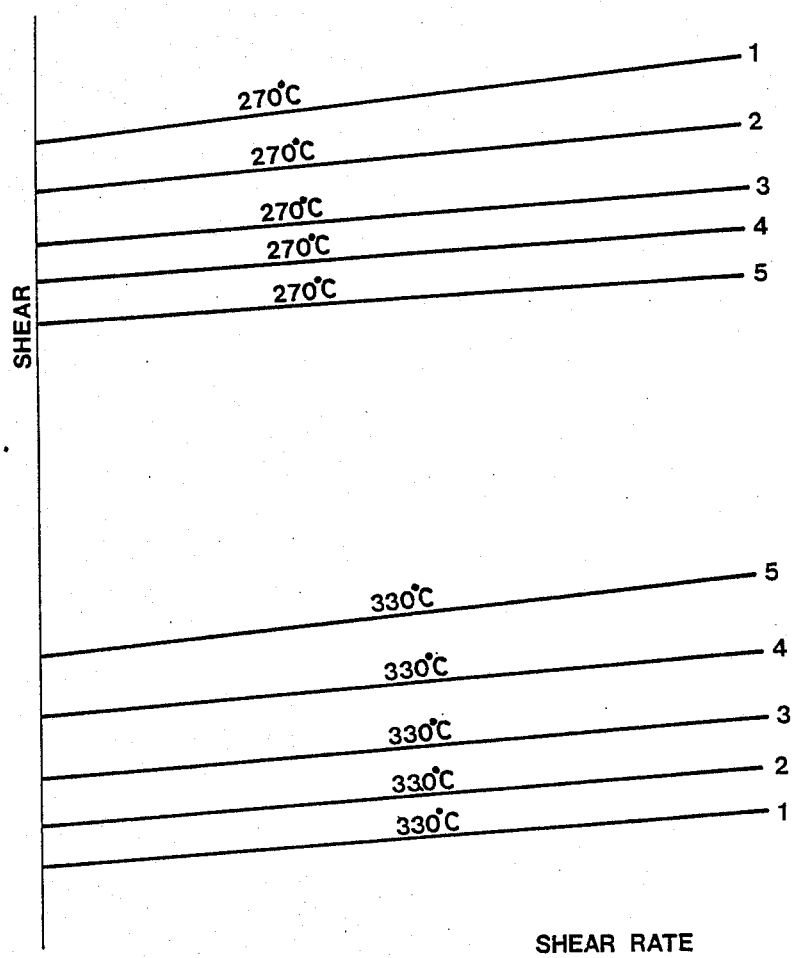
Figure 2:
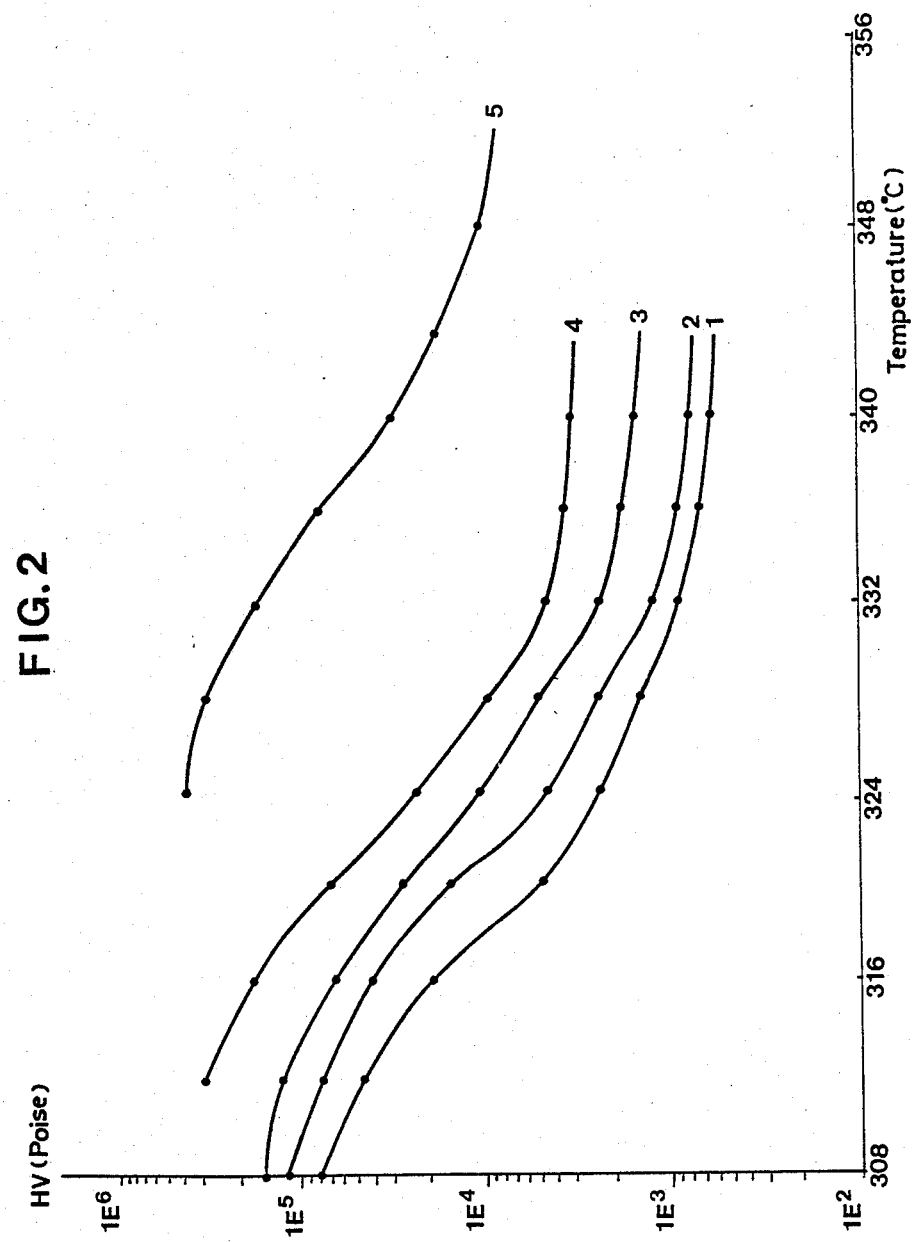

FIG. 1 and FIG. 2 show flow curves and the melt viscosities of the polymers consisting of HD and ABA and IPA in the equivalent ratio of moles. The polymers designated 1 to 5 in FIGS. 1 and 2, have the following components;

(1) Components of polymer 1: HP—APB/IPA=1/1 (ratio of moles)

(2) Components of polymer 2: H—APB/IPA/-H—HD/H—ABA=0.7/1/0.3/0.3 (ratio of moles)

(3) Components of polymer 3: H—APB/IPA/-H—HD/H—ABA=0.5/1/0.5/0.5 (ratio of moles)

(4) Components of polymer 4: H—APB/IPA/-H—HD/H—ABA/=0.3/1/0.7/0.7 (ratio of moles)

(5) Components of polymer 5: IPA/H—HD-/H—ABA=1/1/1 (ratio of moles)

When the polymer is within the domain of liquid crystals, that is at a temperature of 330° C., the melt viscosity of the polymer containing APB is lower than the others. However, if the temperature falls to 270° C., the more APB the polymer contains the better the polymer. Therefore, when within the domain of liquid crystals, the polymer containing APB has better physical and processing properties.

The ABA and HD being used in the present invention are synthesized by a previously known method.

(1) Synthesis of APB

One mole of H—ABA and 1 to 8 moles of H—HD are placed in an autoclave equipped with a nitrogen inlet tube, an agitator, a thermometer, and a condenser, and are then heated slowly. When the temperature is between 190° C. and 260° C., acetic acid is collected and removed. After that, a precipitate forms, and the remaining reactants, which have no effect, are discarded by washing with MeOH. The residue is washed 2 or 3 times with an aqueous solution of NaHCO$_3$ or NaOH 1 to 2N, subsequently with water and then recrystallized. (melting point 159°–160° C., yield 91.36%). Other derivatives of APB may be synthesized by the same method using a suitable monomer.

(2) Preparation of polymer

The polymer of the present invention is prepared from ABA, HD, DCA and APB, wherein, the portion of the said APB should be 20 to 100 mole % of the total of HD and APB and the portion of the said ABA unit should be 20 to 70 mole % of the total of units, so as to have a sequence regularity of monomers in the polymer. Reactants selected in such a proportion are placed in a autoclave, and heated slowly. When the temperature reaches 140° C. to 270° C., acetic acid is collected and removed (the first step). After that, the residue is heated continuously, simultaneously under a vacuum, the IV (inherent viscosity) of the resulting polymer is 0.6 to 4.0 at a temperature of 270° C. to 370° C. and a vacuum of 0.1 to 200 mmHg (The second step). Additionally, the portion of DCA may be 0–10% more or less of the sum of HD and APB. If the proprotion of the APB is less than 20 mole % of the total of HD and APB. If product homogeneity and a lower melt viscosity and melting point, which are caused by adding APB, cannot be expected.

(3) Measurement and Test

IV (inherent viscosity; $\eta_{inh}$) of the polymer produced by the present invention is measured at the temperature of 30° C. and a concentration of 0.5 g/100 cc, using 1,1,1,3,3,3-hexafluoro-2-propanal as the solvent. The said IV can be calculated as follows;

$$\eta_{inh}=[\ln(\eta_{rel})]/C$$

In above equation, $\eta_{rel}$ represents the "Relative Viscosity", wherein "c" is concentration. The liquid crystals of the polymer prepared thus, are studied under a polarizing microscope equipped with a heating stage. The thermal movements of said polymer are measured by a rotational rheometer and a capillary type rheometer. After said polymer is melted, it passes through the filter of 325 mesh and 5 kg of the polymer is removed.

This is ejected under 15 kg/m$^2$ nitrogen pressure through a nozzle which has a 0.34 mm diameter. The column has a diameter of 3 cm and is 20 cm in length. As it is winding at the rate of 600 m/min, its cutting frequency is measured and classified as follows;

Grade A: below five times
Grade B: 6–11 times
Grade C: 12–16 times
Grade D: more than 17 times
Grade E: impossible to eject below the decomposition temperature The as-spun fiber is heated in an oven, improving the tenacity 2–8 times, and the modulus increases too. In addition, IV increases from 0.6–4.0 to 0.8–8.0. In the above heat treatment is possible under all the following conditions: in a vacuum, in air, and in a non-oxidazing atmosphere such as in nitrogen or argon.

At that time tension may or may not be required. Also, the fiber, heat treated at temperature ranging from room temperature to less than flow temperature, can be used as reinforcements in industrial textiles, rubber, and plastic.

The present invention will be explained in more detail as compared with prior techniques. In the acidolysis method known up to now, various blocks, for example, 4-hydroxybenzoic acid, were formed due to the difference in the reactivities of the monomers used. Then, even though the block of 4-hydroxybenzoic acid according to the prior technique had only four monomers, its melting point was greater than 340° C. So, if said polymer contained the above block, its utiltily was reduced. The phenolysis method, proposed to solve the problem, improves the processing ability more than the acidolysis method, but it has many additional problem as previously doscribed. In prior art, when the 4-hydroxybenzoic acid unit was less than 20 mole %, the polymer did not have the the ability to form liquid crystals. In the case of 25 mole %, if the inherent viscosity of the polymer was 1.4, its melting point was near 300° C. Also, in the case of 40 mole %, its melting point was near 340° C., and it couldn't be used without a particular device. Also, the spinning grade of the polymer, prepared by acidolysis, was "grade E". When the 4-hydroxybenzoic acid unit was 30 mole%, the grade of the polymer prepared by phenolysis was "grade C", and in the case of 50 mole %, it was "grade E". To solve these problems, ABA is transformed into APB before being used for polymerization so that the ABA block can not be formed during polymerization.

Consequently, the sequence regularity of monomers in the polymer becomes controllable. Because the 4-hydroxybenzoic acid block unit is not formed, the melting point of the polymer decreases and the sequence regularity increases. The domain of liquid crystals broadens, the degree of forming liquid crystals and the crystallinity in the solid state increases, and therefore, the physical properties of the polymer, such as tenacity and modulus, are improved. When the ABA unit comprises 20–70 mole % of the polymer according to the present invention, ti displays the best physical properties, wherein ABA stands for an optionally substituted —Cl, —Br, —CH₃ or phenyl group; HD stands for a ring optionally substituted —Cl, —Br, —CH₃ or a phenyl group.

In particular, when the inherent viscosity of the polymer from APB, ABA, HD and IPA is about 1.4, the polymer with 20 mole % ABA forms liquid crystals in the melt state.

In the case of 33.3 mole% (composition 1 in FIG. 1), ABA reacts with HD to produce APB, then APB and IPA react with each other again by the same mole ratio to produce the said polymr. The melting point decreases by 30°–70° C. to near 280° C. as compared to 310°–350° C., and the spinning grade is "grade A".

In the case of composition 2, the melting point is near 290° C., and the spinning grade is "grade A", in the case of composition 3, the melting point is approximately 295° C., and the spinning grade is "grade A".

In the case of composition 4, the melting point is near 300° C. and the spinning grade is "grade B". When the ratio of APB/IPA/HD/ABA is 0.2/1/0.8/0.8, the melting point is 310°–330° C. and the spinning grade is "grade C". Also, if the content of the 4-hydroxybenzoic acid unit is more than 50 mole%, processing according to a prior technique becomes considerably more difficult due to the increase in the melting point.

Generally, the higher the content of the ABA units in the polymer, the better the physical properties. In prior art, when the content becomes 50 mole %, it is nearly impossible to process because of the increase in the melting point due to the formation of the ABA block. But when APB reacts with ABA and IPA to produce the polymer, even though the content of ABA in the polymer is 50 mole%, the melting point ranges from 310° to 330° C. (depending on the molecular weight) and the spinning grade is "grade A". Moreover, in the case of 60 mole%, the melting point is near 340° C. and the spinning grade is "grade B".

A detailed description of the invention is contained in the following examples.

EXAMPLE 1

523.35 g of H—APB (1.67 moles) and 276.65 g of IPA (1.67 moles) were added to a autoclave equipped with a nitrogen inlet tube and a distillation head connected to a condenser. Heat was applied slowly until a temperature of 270° C. was reached.

Acetic acid was collected and removed. After that, the condenser was removed, and the nitrogen current was stopped. Said reaction tube was heated again slowly under a vacuum until the conditions of 340° C. and 2 mmHg were met. These conditions maintained for one hour while the reaction went to completion.

The IV of the polymer thus obtained was 2.53. The polymer melt was injected through a nozzle with a diameter of 0.34 mm at 345° C., and was wound at a rate of 600 m/min.

A filament having T/E/Mi/Den=3.03/1.7/419/8.6 was obtained. The said polymer was given the spinning grade A.

The filament was heated from room temperature to 135° C. under flowing nitrogen gas, then it was heat treated at 135° C. for 1 hour, at 200° C. for 3 hrs, and finally at 265° C. for six hours. The T/E/Mi/Den represented 21.18/3.1/501/8.4, wherein "T" stands for tenacity (g/Den), "E" stands for elongation at break(%), "Mi" stands for initial modulus (g/Den), and "Den" stands for denier.

EXAMPLE 2

In the same apparatus as example 1, 352.02 g of H—APB (1.12 moles), 265.81 g of IPA (1.60 moles), 95.91 g of H—HD (0.47 mole), and 86.40 g of H—ABA (0.48 mole) were placed into an autoclave, and heated slowly to 265° C. with agitation under a flow of nitrogen.

During that time, acetic acid was collected and removed. Following that, the condenser was removed, and the nitrogen current was stopped. The autoclave tube was heated again while a vacuum state was slowly being created, until the conditions of 340° C. and 2 mmHg were reached and maintained for one hour till the reaction was complete.

The IV of the polymer thus obtained was 2.34, and the polymer was spun, and heat treated as in example 1. A filament having the following properties was thus prepared;

(1) The spinning grade: A
(2) Before heat treatment: T/E/Mi/Den=3.72/1.5/430/8.6
(3) After heat treatment: T/E/Mi/Den=20.08/3.1/498/8.5

EXAMPLE 3

In the same apparatus as example 1, 246.9 g of H—APB (0.70 mole), 260.2 g of IPA (1.57 moles), 156.5 g of H—HD (0.81 mole) and 141.0 g of H—ABA (0.78 mole) were added into a autoclave, heated slowly to 260° C. with agitation under nitrogen flow. During that time, acetic acid was collected and removed. After that, the polymer was treated in the same way as in Example 1, and then the polymer and the filament were prepared. They had the following properties;

(1) The IV of the polymer: 2.21
(2) The spinning grade: A
(3) Before heat treatment: T/E/Mi/Den=3.51/1.4/418/3.5
(4) After heat treatment: T/E/Mi/Den=19.31/2.9/491/8.3

EXAMPLE 4

144.8 g of H—APB (0.46 mole), 254.3 g of IPA (1.53 moles) 214.2 g of H—HD (1.10 moles), and 192.9 g of H—ABA (1.07 moles) were treated in the same way as Example 3. The polymer and the filament which were prepared had the following properties;

(1) The IV of the polymer: 1.89
(2) The spinning grade: B
(3) Before heat treatment: T/E/Mi/Den=3.14/1.4/415/8.4
(4) After heat treatment: T/E/Mi/Den=18.26/2.7/490/8.3

EXAMPLE 5

47.07 g of H—APB (0.15 mole), 248.31 g IPA (1.50 moles), 269.34 g of H—HD (1.39 moles), and 242.62 g H—ABA (1.35 moles) were treated in the same way as Example 3. The prepared polymer and the filament had the following properties;

(1) The IV of the polymer: 1.47
(2) The spinning grade: B (3) Before heat treatment: T/E/Mi/-Den=2.41/1.2/386/8.4
(4) After heat treatment: T/E/Mi/-Den=17.26/2.8/488/8.3

EXAMPLE 6

531.17 g of CH$_3$—APB (1.62 moles) and 268.81 g of IPA (1.52 moles) were treated in the same way as Example 2. The polymer and the filament, having the properties as follows, were prepared.
(1) The IV of the polymer: 2.51
(2) The spinning grade: B
(3) Before heat treatment: T/E/Mi/-Den=3.53/1.9/380/8.6
(4) After heat treatment: T/E/Mi/-Den=20.19/3.9/462/8.4

EXAMPLE 7

541.86 g of Cl—APB (1.55 moles) and 258.41 g of TPA (1.55 moles) were treated in the same way as Example 2. The polymer and the filament with the following properties were prepared.
(1) The IV of the polymer: 2.61
(2) The spinning grade: E
(3) Before heat treatment: T/E/Mi/-Den=3.69/1.8/383/8.6
(4) After heat treatment: T/E/Mi/-Den=20.43/3.7/469/8.3

COMPARATIVE EXAMPLE 1

In the same apparatus as Example 1, 359.68 g of H—HD (1.85 moles), 324.00 g of H—ABA (1.8 moles), and 299.03 g of IPA (1.8 moles) were added and treated in the same way as Example 2. The polymer and the filament, having the following properties were prepared.
(1) The IV of the polymer: 1.41
(2) The spinning grade: E

COMPARATIVE EXAMPLE 2

In the same apparatus as Example 1, 181.46 g of hydroquinone (1.65 moles), 342.72 g of 4-hydroxybenzoic acid phenyl ester (1.60 moles), and 509.28 g of diphenyl isophthalate (1.6 moles) were added into the autoclave, and heated slowly to 270° C. with agitation and the nitrogen flow. During that time, the phenol was collected and removed. After that, the said product was treated in the same way as Example 1. The polymer and the filament were obtained having the following properties;
(1) The IV of the polymer: 1.63
(2) The spinning grade: C
(3) Before heat treatment: T/E/Mi/-Den=3.15/1.3/441/8.3
(4) After heat treatment: T/E/Mi/-Den=18.18/2.4/499/8.2

We claim:

1. An aromatic polyester polymer having recurring units of formula (I):

(I) [structure shown]

-continued

[structures shown for (I) continued]

wherein,
X and Y represent substituents selected from the group consisting of H, Cl, Br, a phenyl group and a C$_1$–C$_4$ alkyl group;
n is a positive integer from 1 to 4, indicating the number of X and Y substituents; k, l, m, x, ... z are positive integers from 1 to 1500; and $$[k/(k+l+m+x+z)] \times 100 = a,$$

where a=20 to 100%, with the proviso that there are no carbonyl-carbonyl or oxygen-oxygen units therein.

2. An aromatic polyester polymer prepared by mixing, in a first step, a 4-acetoxybenzoic acid derivative of formula (II);

(II) [structure shown]

a hydroquinone diacetate derivative of formula (III);

(III) [structure shown]

a dicarboxylic acid of formula (IV);

(IV) [structure shown]

and a 4-acetoxy-4(-acetoxyphenyl)benzoate derivative of formula (V);

(V) [structure shown]

wherein,

X and Y represent substituents selected from the group consisting of H, Cl, Br, a phenyl group and a $C_1$–$C_4$alkyl group; and n is a positive integer from 1 to 4, indicating the number of X and Y substituents; and heating the mixture to a constant temperature to remove acetic acid which is generated in said mixture, and, in a second step, heating the mixture from the first step under reduced pressure to obtain the polymer.

3. The polymer according to claim 2, wherein said 4-acetoxybenzoic acid derivative is selected from the group consisting of 4-acetoxybenzoic acid, 4-acetoxy-2-chlorobenzoic acid, 4-acetoxy-3-chlorobenzoic acid, 4-acetoxy-2-bromobenzoic acid, 4-acetoxy-3-bromobenzoic acid, 4-acetoxy-2-ethylbenzoic acid, 4-acetoxy-3-methylbenzoic acid, 4-acetoxy-2-phenylbenzoic acid and 4-acetoxy-3-phenylbenzoic acid.

4. The polymer according to claim 2, wherein said hydroquinone diacetate derivative is selected from the group consisting of hydroquinone diacetate, chlorohydroquinone diacetate, promohydroquinone diacetate, methylhydroquinone diacetate and phenylhydroquinone diacetate.

5. The polymer according to claim 2, wherein the mole fraction of units from said 4-acetoxybenzoic acid derivative is between 20–70% of the total units in the polymer.

6. The polymer according to claim 2, wherein the mole fraction of units from said 4-acetoxy-(4-acetoxyphenyl)benzoate derivative is between 20–100 mole % of the total of the units from said hydroquinone diacetate derivative and the units from said 4-acetoxy-(4-acetoxyphenylbenzoate derivative.

7. The polymer according to claim 2, wherein the mole fraction of dicarboxylic acid units is 0–10 mole % more or less than that of a mixture which is composed of the units of said 4-acetoxy-(4-acetoxyphenyl)benzoate derivatives and the units of said hydroquinone diacetate derivatives.

8. The polymer according to claim 2, wherein said polymer has an inherent viscosity in the range of from 0.6 to 4.0, as determined at 30° C. and at a concentration of 0.5 g/100 cc, using 1,1,1,3,3,3-hexafluoro-2-propanol as solvent.

9. A fiber formed from the aromatic polyester polymer according to claim 1.

10. A film formed from the aromatic polyester polymer according to claim 1.

11. A molded product formed from the aromatic polyester polymer according to claim 1.

12. A process for the preparation of an aromatic polyester polymer having recurring units of formula (I),

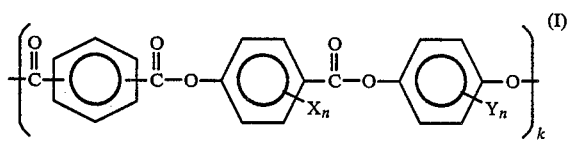

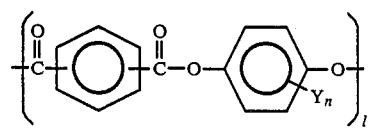

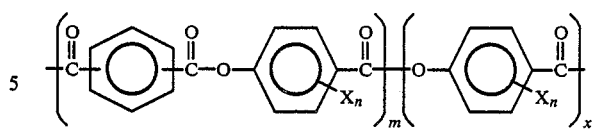

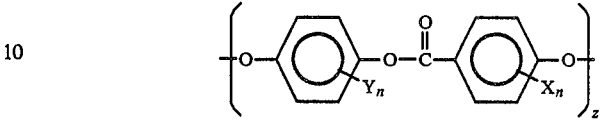

which comprises, in a first step, mixing a 4-acetoxybenzoic acid derivative of formula (II),

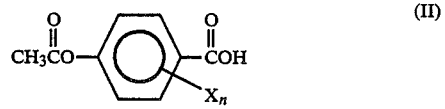

a hydroquinone diacetate derivative of formula (III),

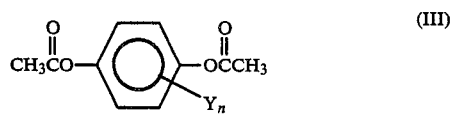

a dicarboxylic acid of formula (IV),

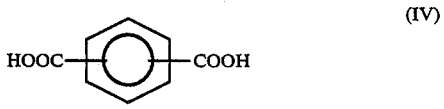

and a 4-acetoxy-(4-acetoxyphenyl)benzoate derivative of formula(V),

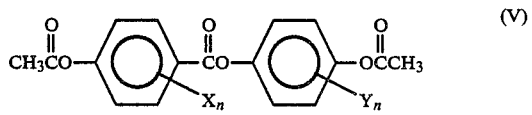

wherein
X and Y represent substituents selected from the group consisting of H, Cl, Br, a phenyl group and a $C_1$–$C_4$ alkyl group;

n is a positive integer from 1 to 4 indicating the number of X and Y substituents; k,l,m,x, . . . z are positive integers from 1 to 1500;

$$[k/(k+l+m+x+z)] \times 100 = a;$$

where a=20 to 100%; with the proviso that there are no carbonyl-carbonyl or oxygen-oxygen units therein, and heating the mixture to a constant temperature to remove acetic acid which is generated in said mixture, and, in a second step, heating the mixture from the first step under reduced pressure to obtain the polymer.

13. The process according to claim 12, wherein the mixture in the first step is heated to temperatures of about 140° to about 270° C.

14. The process according to claim 12, wherein the mixture in the second step is heated from a temperature of about 270° to about 370° C.

15. The process according to claim 12, wherein the reduced pressure is about 0.1 to about 200 mmHg.

* * * * *